(12) United States Patent
McCallum et al.

(10) Patent No.: US 7,735,742 B2
(45) Date of Patent: Jun. 15, 2010

(54) SMART CARD COMMUNICATION ROUTING

(75) Inventors: Michael McCallum, Elmira (CA); Neil Adams, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 933 days.

(21) Appl. No.: 11/457,162

(22) Filed: Jul. 13, 2006

(65) Prior Publication Data

US 2008/0011848 A1    Jan. 17, 2008

(51) Int. Cl.
 *G06K 19/06* (2006.01)
(52) U.S. Cl. .................. 235/492; 235/380; 235/451; 379/211.01; 455/558
(58) Field of Classification Search .......... 235/492, 235/380, 451; 379/211.01, 211.05
See application file for complete search history.

(56) References Cited

U.S. PATENT DOCUMENTS

| 5,724,417 | A * | 3/1998 | Bartholomew et al. . 379/211.05 |
| 6,799,275 | B1 * | 9/2004 | Bjorn ........................ 713/186 |
| 2003/0014370 | A1 * | 1/2003 | Charrin ....................... 705/65 |
| 2003/0137404 | A1 * | 7/2003 | Bonneau et al. ......... 340/10.41 |
| 2003/0183691 | A1 * | 10/2003 | Lahteenmaki et al. ....... 235/441 |
| 2004/0019564 | A1 * | 1/2004 | Goldthwaite et al. ......... 705/44 |
| 2004/0065734 | A1 * | 4/2004 | Piikivi ........................ 235/451 |
| 2004/0078798 | A1 * | 4/2004 | Kelly et al. .................. 719/310 |
| 2004/0127256 | A1 * | 7/2004 | Goldthwaite et al. ........ 455/558 |
| 2004/0147285 | A1 * | 7/2004 | Urien .......................... 455/558 |
| 2007/0251997 | A1 * | 11/2007 | Brown et al. ................. 235/380 |

FOREIGN PATENT DOCUMENTS

| EP | 1713205 | 10/2006 |
| WO | 03092264 | 11/2003 |
| WO | 2004012352 | 2/2004 |

OTHER PUBLICATIONS

"Smart Card Readers Longhorn Strategy".
Nirmalananthan, Anusha, "The Smart Card Cryptographic Service Provider Cookbook", http://msdn2.microsoft.com/en-us/library/ms953432(d=printer).aspx, Smart Card Technical Articles,(Oct. 2002).
Bengi-Akyuerek, K., Extended European Search Report for EP 06117104.7, Dec. 15, 2006.

* cited by examiner

*Primary Examiner*—Michael G Lee
*Assistant Examiner*—Ali Sharifzada
(74) *Attorney, Agent, or Firm*—Integral Intellectual Property Inc.; Miriam Paton

(57) ABSTRACT

A computerized device has an open communication session with a smart card via a smart card reader. The smart card reader and the computerized device cooperate to enable another computerized device to communicate with the smart card over the open communication session. Communication between the other computerized device and the smart card is routed via the computerized device that has the open communication session.

11 Claims, 3 Drawing Sheets

SMART CARD COMMUNICATION ROUTING

BACKGROUND

Smart Cards (SC) are widely used in conjunction with security measures such as authentication and encryption. For example, in order to access a computerized device and to access information by way of the computerized device, one may have to couple a smart card to the computerized device. Access to the computerized device and to information may be granted following a successful interaction between the computerized device and the smart card. The interaction may involve user input.

A smart card reader (SCR) is a device that can communicate with both the SC and the computerized device and can therefore be used to couple them. The SCR may include one or more driver applications to communicate with the SC and with the computerized device.

A process in the computerized device that needs to communicate with the SC can usually do so by way of a Cryptographic Service Provider (CSP) application, or a smart card driver, in the computerized device. The process sends a request to the CSP which generates the appropriate command to be passed to the SC. The CSP then sends the command to the SCR that in turn passes it to the SC. The SC may generate a response and pass the response to the SCR. The SCR sends the response to the computerized device and it is received by the CSP. The CSP then passes the response to the process from which the command originated.

Some smart card readers are designed to be permanently installed inside a computerized device such as a desktop computer. Other smart card readers, for example, those in the form factor of a PCMCIA (Personal Computer Memory Card International Association) card, are designed to be easily installable and removable at an appropriate bay in a mobile computerized device such as a laptop computer. Other smart card readers are designed to connect to a computerized device via an electrical cable.

In these three examples, the SCR is mechanically and electrically coupled to the computerized device. However, smart card readers that are mechanically disconnected from the computerized device and can communicate with the computerized device using wireless communication are known. Since a wireless smart card reader does not require mechanical coupling to the computerized device, it can in principle maintain parallel communication sessions with two or more computerized devices via the wireless communication.

In a common scenario, a single SC is coupled to a single SCR that is in turn coupled to a single computerized device. The CSP may maintain a continuous open communication with the SCR and over this communication it may maintain a continuous open communication session with the SC.

In another scenario, two or more computerized devices may be able to maintain communication with a single SCR and to attempt to share the services of a single SC that is coupled to the smart card reader. The secure nature of the SC requires that only one session between the SC and a computerized device be open at any given time. Once one computerized device establishes a communication session with the SC, other computerized devices may not be able to access the SC until this session is terminated. Consequently, operations in the other computerized device that require the use of the SC cannot be performed timely.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A Cryptographic Service Provider (CSP) application running in a computerized device is traditionally designed to create a continuous open communication session with a smart card. If a computerized device maintains a communication session with a smart card via a smart card reader, no other computerized device is able to communicate with the smart card via the smart card reader as long as the communication session is in place.

According to embodiments of the invention, executable code in the smart card reader and a Command Proxy Application (CPA) in a device that has an open communication session with the smart card may cooperate to enable another device to communicate with the smart card over the open communication session.

If the smart card reader receives a command for the smart card from a first device, it may check whether the smart card is already involved in a communication session with a second device. If so, the smart card reader may send the command to the second device, in which the command is received by the CPA. The CPA passes the command to the CSP application, which can interact with the smart card reader over the open communication session. After the CSP application receives a response from the smart card over the open communication session, it may pass the response to the CPA. The CPA may then communicate the response to the smart card reader that in turn communicates the response to the first device.

Figure 1:
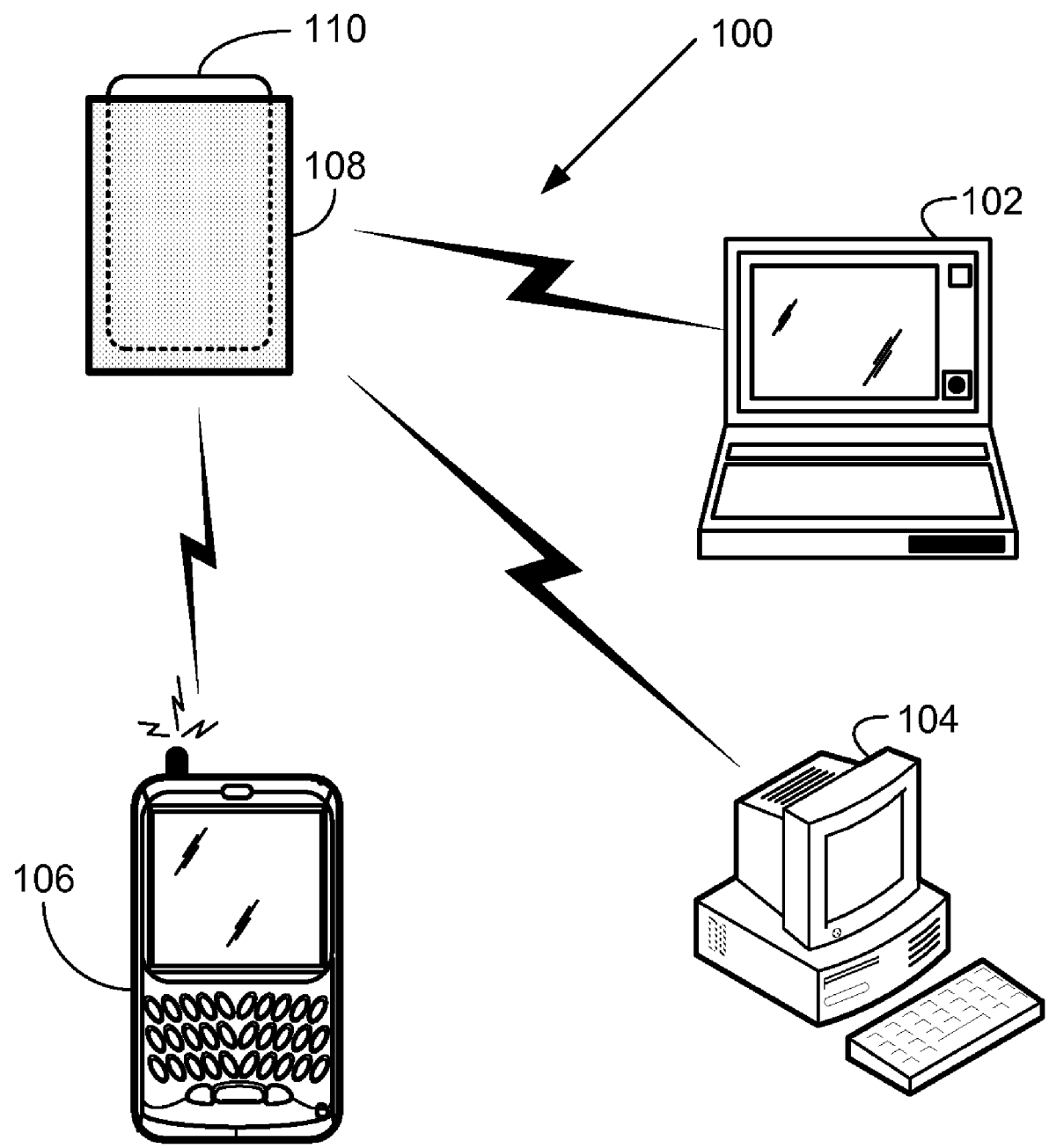
FIG. 1 is a schematic diagram of an exemplary system comprising computerized devices, a smart card reader and a smart card, according to some embodiments of the invention.

FIG. 1 is a schematic diagram of an exemplary system 100 comprising computerized devices 102, 104 and 106, a SCR 108 and a SC 110, according to some embodiments of the invention. SC 110 is shown inserted into SCR 108. Embodiments of the invention are applicable to any computerized device, whether stationary or mobile, that is able to communicate with a SCR. For example, the communication may be possible via a wired, wireless or optical communication means.

A non-exhaustive list of examples for devices 102, 104 and 106 includes any of the following computerized devices, for example, notebook computers, laptop computers, mobile computers, mobile terminals, pocket computers, desktop personal computers, personal digital assistants (PDAs), handheld computers, cellular telephones, MP3 players, and the like.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g. a private decryption key, a private signing key, biometrics, an authentication certificate, etc.), and may include a decryption engine, e.g., a processor and/or dedicated logic, for example dedicated decryption logic and/or dedicated signing logic. A smart card may include a connector for powering the semiconductor device and performing serial communication with an external device. A smart card may be used for visual identification, time cards, door access, and the like.

Although FIG. 1 shows smart card 110 inserted into with SCR 108, embodiments of this invention are equally applicable to contactless smart cards that communicate with their smart card readers via other means, for example, using radio frequency identification (RFID) technology.

Figure 2:
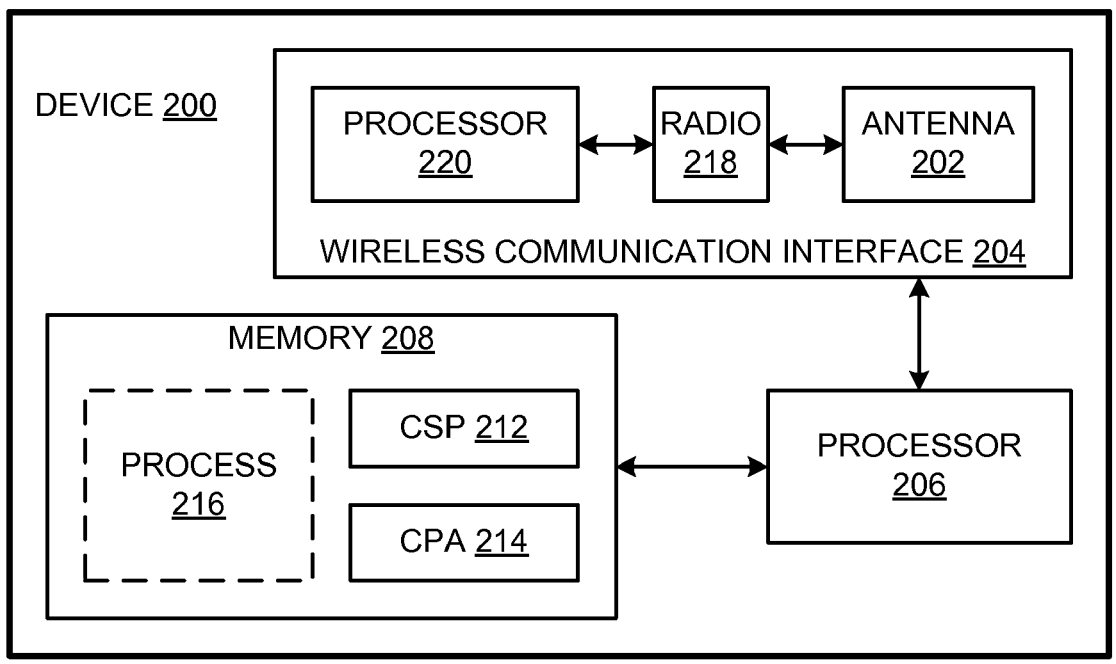
FIG. 2 is a block diagram of an exemplary device, according to some embodiments of the invention.

FIG. 2 is a block diagram of an exemplary computing device 200, according to some embodiments of the invention. Devices 102, 104 and 106 are all examples of device 200.

Device 200 comprises a communication interface 204, a processor 206 coupled to communication interface 204 and a memory 208 coupled to processor 206. Memory 208 may be fixed in or removable from device 200. Processor 206 and memory 208 may be part of the same integrated circuit or in separate integrated circuits.

Figure 4:
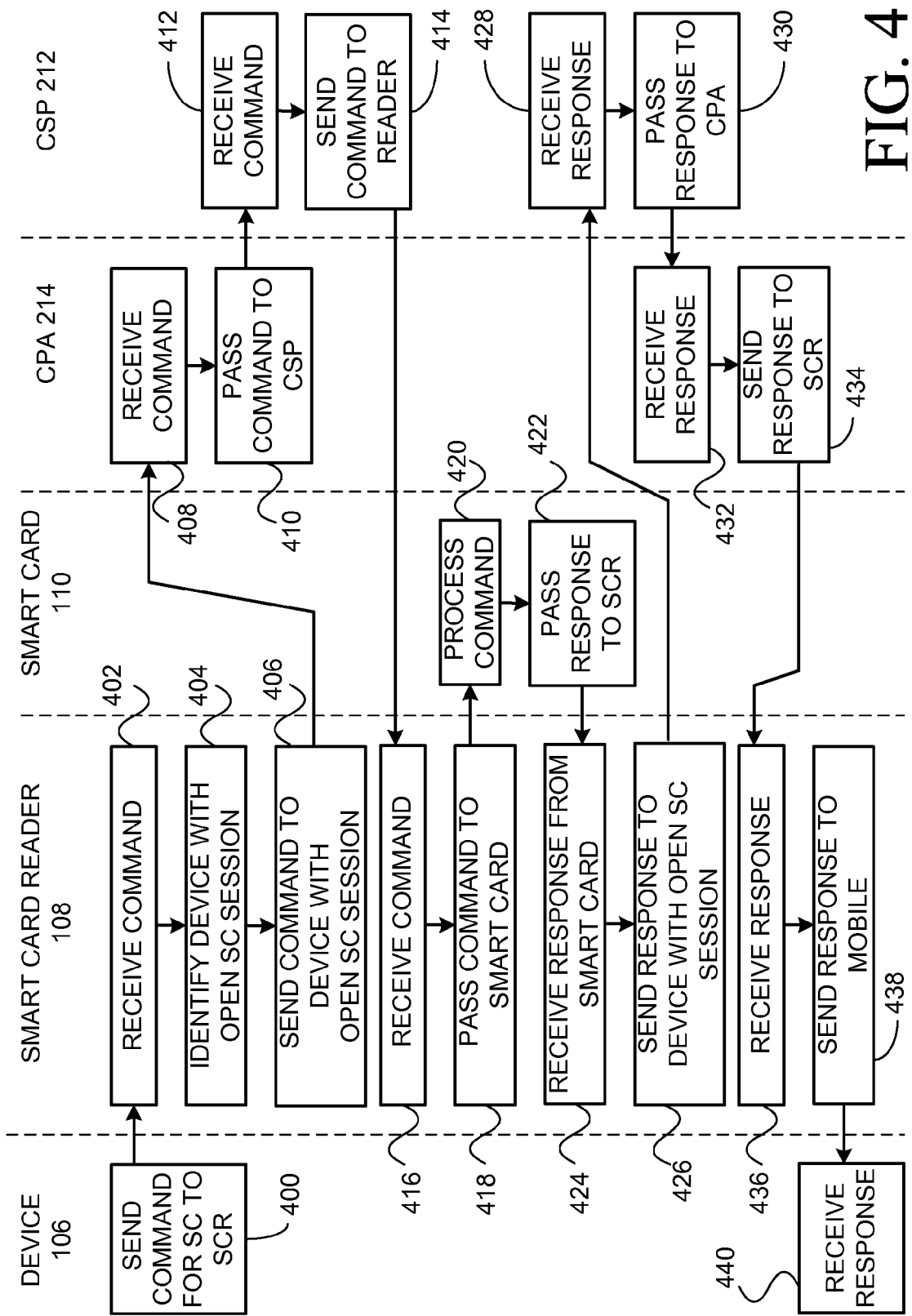
FIG. 4 is a flowchart of an exemplary method to enable communications with a smart card coupled to a smart card reader, according to some embodiments of the invention.

Memory 208 stores CSP executable code 212 and CPA executable code 214 according to embodiments of the invention, which, when executed by processor 206, causes device 200 to perform its part in the method of FIG. 4. CSP 212, when executed by processor 206, functions as a SCR driver. CSP 212 and CPA 214 may be separate executable code or alternatively, one of them may be partly or fully embedded in the other. Memory 208 may optionally store a process 216 that can interact with a smart card via CSP 212.

In the example shown in FIG. 2, communication interface 204 is a wireless communication interface 204 and device 200 also comprises an antenna 202. Wireless communication interface 204 comprises a radio 218 coupled to antenna 202, and a processor 220 coupled to radio 218. Wireless communication interface 204 and processor 206 may be part of the same integrated circuit or in separate integrated circuits.

Figure 3:
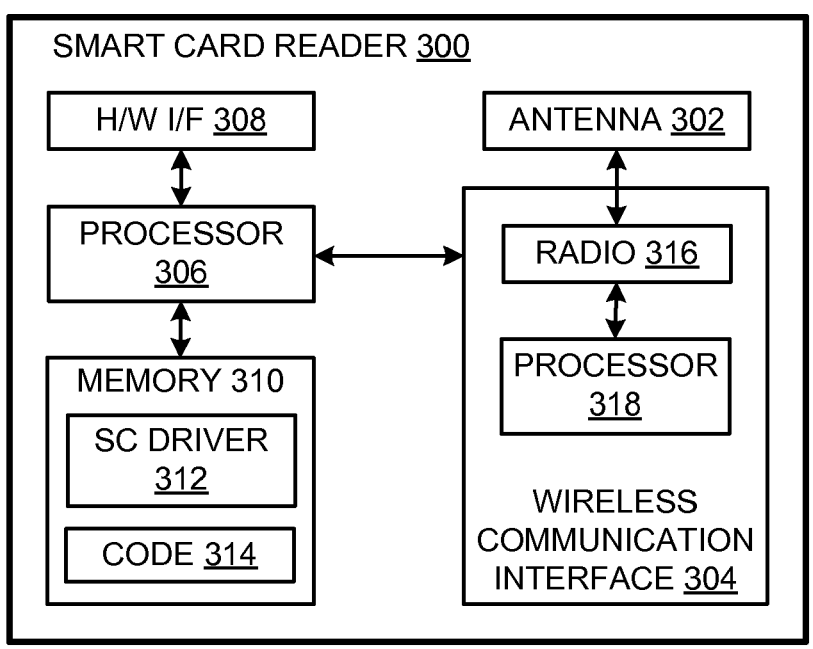
FIG. 3 is a block diagram of an exemplary smart card reader, according to some embodiments of the invention.

FIG. 3 is a block diagram of an exemplary SCR 300, according to some embodiments of the invention. SCR 108 is an example of SCR 300.

SCR 300 includes a communication interface 304, a processor 306 coupled to wireless communication interface 304, a hardware interface 308, and a memory 310 coupled to processor 306. For example, hardware interface 308 is a connector that mates to a corresponding connector with contact pins on a smart card. Memory 310 may be fixed in or removable from smart card reader 300. Memory 310 may be embedded or partially embedded in processor 306.

Memory 310 stores executable code 312 that functions as a smart card driver when executed by processor 306. Memory 310 also stores executable code 314 which, when executed by processor 306, causes device 300 to perform its part in the method of FIG. 4.

Processor 306 and memory 310 may be part of the same integrated circuit or in separate integrated circuits.

In the example shown in FIG. 3, communication interface 304 is a wireless communication interface 304 and SCR 300 also comprises an antenna 302. Wireless communication interface 304 comprises a radio 316 coupled to antenna 302, and a processor 318 coupled to radio 316. Wireless communication interface 304 and processor 306 may be part of the same integrated circuit or in separate integrated circuits.

A non-exhaustive list of examples for antennae 202 and 302 includes dipole antennae, monopole antennae, multilayer ceramic antennae, planar inverted-F antennae, loop antennae, shot antennae, dual antennae, omnidirectional antennae and any other suitable antennae.

A non-exhaustive list of examples of communication protocols with which communication interfaces 204 and 304 may be compatible includes Bluetooth®, ZigBee™, radio frequency identification (RFID), ultra wideband (UWB), IEEE 802.11, and proprietary communication protocols.

A non-exhaustive list of examples for processors 206, 220, 306 and 318 includes a central processing unit (CPU), a digital signal processor (DSP), a reduced instruction set computer (RISC), a complex instruction set computer (CISC) and the like. Furthermore, processors 206, 218, 306 and 318 may be part of application specific integrated circuits (ASICs) or may be a part of application specific standard products (ASSPs).

A non-exhaustive list of examples for memories 208 and 310 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Device 200 and SCR 300 include additional components which are not shown in FIGS. 2 and 3 and which, for clarity, are not described herein.

FIG. 4 is a flowchart of an exemplary method to enable communications with a SC coupled to a SCR, according to some embodiments of the invention. For the simplicity of the explanation, while the method of FIG. 4 is performed, devices 102, 104 and 106 are assumed to have respective secured communication channels established with SCR 108, and device 104 is assumed to have an open communication session with smart card 110.

At 400, device 106 attempts to interact with SC 110 by sending to SCR 108 a command for SC 110. At 402, SCR 108 receives the command. At 404, SCR 108 checks whether SC 110 is involved in an open communication session, and finds that SC 110 is involved in an open communication session with device 104.

Due to the open communication session, SCR 108 cannot pass the command directly to SC 110. Instead, at 406, SCR 108 sends the command to the device having the open communication session with SC 110, i.e. device 104. At 408, the command is received by device 104 and communicated to CPA 214 of device 104. At 410, CPA 214 passes the command to CSP 212 and at 412, CSP 212 receives the command. At 414, CSP 212 sends the command to SCR 108.

At 416, SCR 108 receives the command from device 104 over the open communication session, and SCR 108 passes the command to SC 110 at 418 over the open communication session. At 420, SC 110 receives and processes the command and at 422, SC 110 passes a response to SCR 108 over the open communication session. SCR 108 receives the response from SC 110 at 424, and SCR 108 sends the response at 426 to device 104 over the open communication session.

At 428, CSP 212 of device 104 receives the response from SCR 108 and at 430, CSP 212 pass the response to CPA 214. At 432, CPA 214 sends the response to SCR 108 and at 434 SCR 108 receives the response. At 438, SCR 108 sends the response to device 106 that receives it at 440.

Computer-executable instructions for performing any portions of the above-described method may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by device 104 and/or SCR 108, including by internet or other computer network forms of access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a smart card reader for enabling communication with a smart card coupled to said smart card reader, the method comprising:
   receiving at said smart card reader over a first communication channel a command for said smart card from a first computing device that is coupled to said smart card reader via said first communication channel;
   in the event that said smart card has an open communication session with a second computing device, as a result of which said smart card reader cannot pass said command directly to said smart card, transmitting said command from said smart card reader to said second computing device over a second communication channel for handling by said smart card using said open communication session;
   receiving said command at said smart card reader from said second computing device using said open communication session; and
   passing said command from said smart card reader to said smart card using said open communication session.

2. The method of claim 1, further comprising:
   receiving from said smart card at said smart card reader using said open communication session a response to said command generated by said smart card; and
   transmitting said response from said smart card reader to said second computing device using said open communication session.

3. The method of claim 2, further comprising:
   receiving at said smart card reader said response from said second computing device over said second communication channel; and
   transmitting said response from said smart card reader to said first computing device over said first communication channel.

4. A method in a first computing device having an open communication session with a smart card that is coupled to a smart card reader, the method comprising:
   receiving from said smart card reader at said first computing device a command for said smart card, said command having originated at a second computing device;
   transmitting said command from said first computing device to said smart card via said smart card reader using said open communication session,
   wherein as a result of said open communication session, said smart card reader cannot pass said command directly to said smart card;
   receiving at said first computing device from said smart card reader using said open communication session a response to said command generated by said smart card; and
   transmitting said response from said first computing device to said smart card reader for further transmission to said second computing device.

5. A computer-readable medium having computer-executable instructions thereon which, when executed by a smart card reader having a smart card coupled thereto, result in:
   receiving at said smart card reader over a first communication channel a command for said smart card from a first computing device that is coupled to said smart card reader via said first communication channel;
   in the event that said smart card has an open communication session with a second computing device, as a result of which said smart card reader cannot pass said command directly to said smart card, transmitting said command from said smart card reader to said second computing device over a second communication channel for handling by said smart card using said open communication session;
   receiving said command at said smart card reader from said second computing device using said open communication session; and
   passing said command from said smart card reader to said smart card using said open communication session.

6. The computer-readable medium of claim 5, wherein said instructions, when executed by said smart card reader, further result in:
   receiving at said smart card reader from said smart card using said open communication session a response to said command that was generated by said smart card; and
   transmitting said response from said smart card reader to said first computing device over said first communication channel.

7. The computer-readable medium of claim 6, wherein said instructions, when executed by said smart card reader, further result in:

receiving at said smart card reader said response from said second computing device over said second communication channel; and transmitting said response from said smart card reader to said first computing device over said first communication channel.

8. A computing device comprising:

a communication interface through which said computing device is able to communicate with a smart card reader;

a processor coupled to said communication interface; and a memory coupled to said processor, said memory to store a cryptographic service provider application through which said computing device is able to maintain an open communication session with a smart card coupled to said smart card reader, and to store code arranged to receive from said smart card reader a command for said smart card that originates from another computing device and to transmit said command to said smart card via said cryptographic service provider application using said open communication session, wherein said code is further arranged to receive from said smart card reader over said open communication session a response to said command generated by said smart card and to transmit said response from said computing device to said smart card reader for further transmission to said other computing device.

9. A smart card reader comprising:

a communication interface through which said smart card reader is able to communicate with a first computing device over a first communication channel and to communicate with a second computing device over a second, different, communication channel;

a hardware interface through which said smart card reader is able to communicate with a smart card;

a processor coupled to said communication interface and to said hardware interface; and a memory coupled to said processor, said memory to store code arranged to receive a command for said smart card from said first computing device over said first communication channel and to transmit said command to said second computing device over said second communication channel for handling by said smart card using an open communication session that exists between said smart card and said second computing device, wherein as a result of said open communication session, said smart card reader cannot pass said command directly to said smart card, and wherein said code is further arranged to receive said command from said second computing device using said open communication session and to pass said command to said smart card using said open communication session.

10. The smart card reader of claim 9, wherein said code is further arranged to receive from said smart card using said open communication session a response to said command generated by said smart card and to transmit said response to said second computing device using said open communication session.

11. The smart card reader of claim 10, wherein said code is further arranged to receive said response from said second computing device over said second communication channel and to transmit said response to said first computing device over said first communication channel.

* * * * *